US008850212B2

(12) United States Patent
Proudler et al.

(10) Patent No.: US 8,850,212 B2
(45) Date of Patent: Sep. 30, 2014

(54) EXTENDING AN INTEGRITY MEASUREMENT (75) Inventors: Graeme John Proudler, Bristol (GB); Liqun Chen, Bristol (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 44 days.

(21) Appl. No.: 13/698,235

(22) PCT Filed: May 12, 2011

(86) PCT No.: PCT/US2011/036175
§ 371 (c)(1),
(2), (4) Date: Nov. 15, 2012

(87) PCT Pub. No.: WO2011/146305
PCT Pub. Date: Nov. 24, 2011

(65) Prior Publication Data
US 2013/0061056 A1 Mar. 7, 2013

(30) Foreign Application Priority Data

May 21, 2010 (GB) .................................. 1008514.0

(51) Int. Cl.
G06F 21/57 (2013.01)
G06F 21/51 (2013.01)
G06F 21/50 (2013.01)
G06F 21/60 (2013.01)
G06F 21/00 (2013.01)

(52) U.S. Cl.
CPC ....................................... *G06F 21/57* (2013.01)
USPC ............... 713/176; 713/151; 713/168; 726/2; 726/16; 726/17; 726/19; 726/22; 726/25; 726/26; 726/27; 726/29; 726/30

(58) Field of Classification Search
CPC ......... G06F 21/00; G06F 21/50; G06F 21/51; G06F 21/57; G06F 21/60

USPC ............ 713/151, 168, 176; 726/2, 16–17, 19, 726/21–22, 25–27, 29–30
See application file for complete search history.

(56) References Cited

U.S. PATENT DOCUMENTS

2001/0029561 A1 10/2001 Porterfield
2006/0075223 A1 4/2006 Bade et al.
(Continued)

FOREIGN PATENT DOCUMENTS

| CN | 101122936 A | * | 2/2008 |
| GB | 2424494 | | 9/2006 |
| GB | 2464966 | | 5/2010 |
| WO | WO-2010/041467 | | 4/2010 |
| WO | WO-2010/095432 | | 8/2010 |

OTHER PUBLICATIONS

GB Search Report for UK Patent Application No. 1008514.0, Intellectual Property Office, Feb. 29, 2012.

(Continued)

*Primary Examiner* — Joseph P. Hirl
*Assistant Examiner* — Kalish Bell (57) ABSTRACT

A method of extending an integrity measurement in a trusted device operating in an embedded trusted platform by using a set of policy commands to extend a list of Platform Configuration Registers (PCRs) for the device and the current values of the listed PCRs and an integrity value identifying the integrity measurement into a policy register, verify a signature over the integrity value extended into the policy register, and, if verification succeeds, extend a verification key of the trusted platform, plus an indication that it is a verification key, into the policy register, compare the integrity value extended into the policy register with a value stored in the trusted platform, and, if they are the same: extend the stored value, plus an indication that it is a stored value, into the policy register, and extend the integrity measurement in the trusted device if the value in the policy register matches a value stored with the integrity measurement.

10 Claims, 6 Drawing Sheets

(56) References Cited

U.S. PATENT DOCUMENTS

| | | |
|---|---|---|
| 2007/0226505 A1* | 9/2007 | Brickell .................. 713/176 |
| 2008/0282348 A1* | 11/2008 | Proudler et al. ............ 726/22 |
| 2009/0070573 A1 | 3/2009 | Ebringer et al. |
| 2009/0172814 A1 | 7/2009 | Khosravi et al. |
| 2010/0318781 A1* | 12/2010 | Nicolson et al. ............ 713/2 |

OTHER PUBLICATIONS

GB Search Report for UK Patent Application No. 1008514.0, Intellectual Property Office, Sep. 19, 2011.

International Search Report and Writen Opinion received in PCT Application No. PCT/US2011/036175, mailed Dec. 7, 2011, pp. 9.

* cited by examiner

EXTENDING AN INTEGRITY MEASUREMENT

BACKGROUND

A significant consideration in interaction between computing entities is trust—whether a foreign computing entity will behave in a reliable and predictable manner, or will be (or already is) subject to subversion. Trusted systems which contain a trusted entity in the form of a hardware trusted component (or device) at least logically protected from subversion have been developed by the companies forming the Trusted Computing Group (TCG). The TCG develops specifications in this area, for example the "TCG TPM Specification" Version 1.2, which is published on the TCG website https://www.trustedcomputinggroup.org/. Also, the TCG mobile phone specifications (Mobile Trusted Module (MTM) specifications) which enable trusted computing on mobile platforms, which MTM specifications have been developed with the particular needs and limitations associated with mobile devices in mind. The implicitly trusted components of a trusted system enable measurements of a trusted system and are then able to provide these in the form of integrity metrics to appropriate entities wishing to interact with the trusted system. The receiving entities are then able to determine from the consistency of the measured integrity metrics with known or expected values that the trusted system is operating as expected.

One of the original design imperatives of trusted components was that they can be produced inexpensively. This leads to a number of tradeoffs in terms of what trusted components can and cannot do. For example, trusted components at least originally had no real time trusted clock and no symmetric cryptography engine. Both of these features are relatively standard in mainstream computing but were not deemed essential to (and too costly for) a base specification for trusted components. As new generations of trusted component are specified it is anticipated that more and more functions will naturally be added—as technology advances and costs reduce—as has been the case in moving from Version 1.1 to 1.2 of the TCG Specification for example. There will always be tradeoffs in terms of which functions a trusted component should and should not do. Accordingly, the replacement of dedicated commands in a trusted environment with generalised commands can result in improved utilisation of resources which can lead to lower cost and greater efficiency, which is particularly valuable in a mobile computing environment for example.

BRIEF DESCRIPTION OF THE DRAWINGS

Embodiments of the invention will now be described, by way of non-limiting example, with reference to the accompanying diagrammatic drawings of the prior art and of embodiments of the invention, in which.

DESCRIPTION

Integrity metrics will typically include measurements of the software used by a trusted system. These measurements may, typically in combination, be used to indicate states, or trusted states, of the trusted system. Measurements will typically be recorded in the form of "digests"—results of hashing the measured data using a hashing algorithm to produce a fixed-size result. Such digests may be combined into a "platform configuration register" (PCR) of a trusted component—a trusted component will generally have a plurality of PCRs dedicated to specific purposes. In certain Trusted Computing Group specifications, mechanisms are also taught for "sealing" data to a particular platform state—this has the result of encrypting the sealed data into an inscrutable "opaque blob" containing a value derived at least in part from measurements of software on the platform. The measurements as indicated comprise digests of the software, because digest values will change on any modification to the software. According to a most general policy of trusted components according to TGC specifications, this sealed data may only be released outside of the trusted component if the trusted component measures the current platform state and finds it to be represented by the same value(s) as in the opaque blob. In view of this process, when a legitimate change is to occur to the software or hardware configuration of a trusted platform, resulting in changes in associated PCR values, it may be necessary to undertake an administrative process at the same time that recovers all sealed data while still in the old state and re-seals the data to the new PCR values and respective platform state. Of course, whether or not data is recovered and released can also depend on many other kinds of policy depending on the nature of the respective operation.

Before describing embodiments of the present invention, two prior-art trusted computing platforms will be described with reference to FIGS. 1 to 8 to introduce certain terms and concepts later used in describing the embodiments of the invention. The specifics of the described prior-art trusted computing platforms (starting with the next paragraph) are not intended to limit the scope of the present invention unless otherwise stated. As used herein, the term "computing platform" is to be understood as encompassing any apparatus capable of effecting computation and is not limited to computers. Accordingly, digital cellular equipment, including mobile telephones and personal digital assistants (PDAs), are within the scope of the term "computing platform", and are in fact particularly relevant since the provision of a Mobile Trusted Module will likely be incorporated in most modern mobile telephones. In addition, the term computing platform herein includes, except where the context otherwise requires, a virtual computing platform environment, which is substantially independent (e.g. encapsulated or compartmentalised) of other such computing environments, which all reside on a common physical computing platform (an example of such an environment is given hereinafter).

Furthermore, in the present context "trust" is the expectation that a device will behave in a particular manner for a specific purpose, and a "user" can be a local user or a remote user such as a remote computing entity.

General Characteristics of a Prior-Art Trusted Platform

A trusted computing platform provides for trustable platform integrity measurement and reporting and to this end has a plurality of shielded locations, that is, places (memory, registers, etc.) where it is safe to operate on sensitive data. Integrity measurement is the process of obtaining integrity metric measurements of a platform (that is, measurements of platform characteristics that affect the integrity—trustworthiness—of the platform) and putting the measurements (here taken to encompass derivative values such as digests) into shielded locations; in TCG parlance, the shielded locations used for storing integrity metrics are referred to as Platform Configuration Registers or "PCRs" and this terminology will be used hereinafter. The values held in the PCRs are reportable integrity metric values. Integrity reporting is the process of attesting to integrity metrics recorded in PCRs in a way that associates the metrics with the platform concerned. A trusted computing platform may also provide, in addition to shielded locations, trustable storage for securely storing data in encrypted form and for ensuring that access to this data only occurs in a named environment. The foregoing trusted features will normally involve the use of cryptographic functions.

A user can verify the correct operation of a trusted computing platform, for example, before exchanging data with the platform, by requesting the trusted platform to provide one or more integrity metrics. The user receives the integrity metric or metrics, and compares them against values which it believes to be true (these values being provided by a trusted party "TP" that is prepared to vouch for the trustworthiness of the platform or by another party the user is willing to trust). If there is a match, the implication is that at least part of the platform is operating correctly, depending on the scope of the integrity metric. If there is no match, the assumption is that the entire platform has been subverted and cannot be trusted (unless isolation technologies are employed to restrict the scope of what cannot be trusted).

Once a user has established trusted operation of the platform, he exchanges data with the platform. For a local user, the exchange might be by interacting with some software application running on the platform. For a remote user, the exchange might involve a secure transaction. In either case, the data exchanged is preferably 'signed' by the trusted platform. The user can then have greater confidence that data is being exchanged with a platform whose behaviour can be trusted. Data exchanged may be information relating to some or all of the software running on the computer platform.

Trusted Entity Providing for Roots of Trust

In order to impart to a computing platform the characteristics of a trusted computing platform, it is necessary to provide the platform with certain inherently trustable functionalities (collectively making up what is herein referred to as a "trusted entity") which are physically or logically bound to the platform and operate, together with elements of the computing platform, to provide the desired trusted characteristics (minimally, integrity measurement and reporting). In effect, the trusted entity provides the platform with 'roots of trust' and an example of this is given below.

For trusted platforms following the TCG Specifications, the trusted entity is a hardware component or device called a Trusted Platform Module ("TPM") or Trusted Mobile Module ("TMM"), which serves to provide, together with elements of the computing platform to which the trusted entity is bound, the following "roots of trust":

A root of trust for measurement (RTM),—the RIM is a computing engine capable of making inherently reliable integrity measurements and is typically the normal platform computing engine (main processor) controlled by the so-called core root of trust for measurement (CRTM), that is the instructions executed by the platform when it acts as the RTM. The CRTM is logically part of the aforesaid trusted entity and would ideally be included in the TPM but for cost reasons is usually implemented by a separate ROM.

A root of trust for storage (RTS)—the RTS is a computing engine capable of maintaining an accurate summary in PCRs of values of integrity measurement digests; the RTS may also provide for 'protected storage' serving to protect data (frequently keys) held in external storage devices as opaque "blobs" and 'sealed'/'unsealed' for access by the RTS against a particular environment (as indicated by PCR values).

A root of trust for reporting (RTR)—the RTR is a computing engine responsible for establishing platform identities, reporting platform configurations (PCR values), protecting reported values and establishing a context for attesting to reported values. The RTR shares responsibility of protecting measurement digests with the RTS.

It may be noted that, as indicated above, the elements forming, the RTM are typically (though not necessarily) outside a trusted module; in contrast, the RTS and RTR are normally provided by the trusted module itself.

Generally, any trusted platform will provide such roots of trust (though possibly in a different conceptual arrangement).

A trusted entity can be embodied as a hardware device (which may include a program-controlled processor) or in software for execution by a main processor of the platform (in which case it is usually referred to as a 'virtual' trusted entity/ device or, in the case of a TPM/TMM, a virtual TPM/TMM). In practice, virtual trusted entities are normally provided on platforms that have a basic hardware trusted entity for the basic platform environment but which employ further trusted entities for virtual environments created on the platform. A hardware trusted entity is usually physically bound to the platform with which it is associated whereas a software trusted entity is logically bound to the platform with which it is associated.

It is, of course, also possible to implement a trusted entity as a combination of hardware device and software intended for execution on the platform; where the trustworthiness of the software can be established by a chain of trust rooted in the RTM.

The functionality of the trusted entity can be distributed between multiple devices (in the case of a hardware embodiment) or code blocks (in the case of a 'virtual' embodiment).

The trusted entity uses cryptographic processes but does not necessarily provide an external interface to those cryptographic processes. The trusted entity should be logically protected from other entities—including other parts of the platform of which it is itself a part. Also, most desirable implementations provide the trusted entity with protective features to protect secrets stored by or being processed by the trusted entity by making them inaccessible to other platform functions, and provide an environment that is substantially immune to unauthorised modification.

For a hardware embodiment, the trusted entity, therefore, preferably consists of one physical component that is tamper-resistant. Techniques relevant to tamper-resistance are well known to those skilled in the art of security. These techniques include methods for resisting tampering (such as appropriate encapsulation of the trusted entity), methods for detecting tampering (such as detection of out of specification voltages, X-rays, or loss of physical integrity in the trusted entity casing), and methods for eliminating data when tampering is evident. As regards a 'virtual' trusted entity, although software may not afford such a high degree of tamper-resistance as a hardware device, this may be compensated for by additional protection measures. For example, the software code may include self-test functions, to check the integrity of the trusted functionality.

Chain of Trust

The trustable integrity measurement and reporting enabled by the presence of the trusted entity in the platform typically enables trust to be placed in other platform components or functions which in turn perform trustable integrity measurement of further platform components or functions and so on. This process of extending the boundary of what is trustable is called "transitive trust" and can be thought of as establishing a chain of trust rooted in the platform's roots of trust. Thus in a typical example:

- the trusted code for enacting an initial integrity measurement (for example, the CRTM in TCG parlance) serves to measure an integrity metric of OS loader code to enable trust to be placed in this code (if the metric matches an expected value);
- the OS loader code in turn determines an integrity metric for Operating System code to enable trust to be placed in the operating system;
- the operating system in turn determines an integrity metric for application code to enable trust to be placed in the application.

First Example Prior-Art Trusted Platform—Overview

Figure 1:
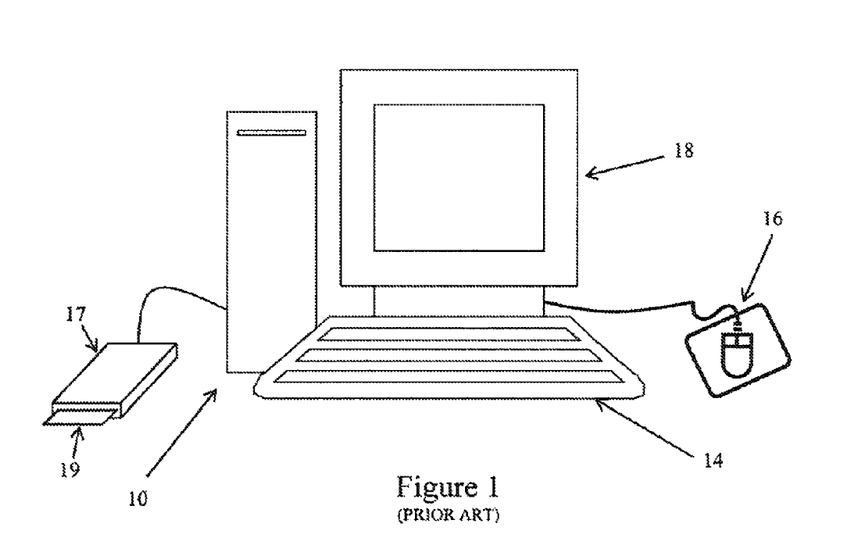
FIG. 1 is a schematic diagram illustrating an exemplary prior-art computing platform.

An example trusted platform 10 is illustrated in the diagram in FIG. 1. The computing platform 10 is shown as a so-called personal computer and is entirely conventional in appearance—it has associated the standard features of a keyboard 14, mouse 16 and visual display unit (VDU) 18, which provide the physical 'user interface' of the platform. In addition, the platform may have associated security devices, such as a smart card reader 17 for reading a smart card 19. Such security devices provide the platform with the capability to enact two-factor authentication. Additional or alternative security devices (not shown) may include biometric readers, such as finger print readers or iris readers. The computing platform 10 is arranged to run a standard operating system such as Microsoft Windows XP for example. Alternatively, a mobile device such as a mobile telephone can be a trusted platform, and references hereinafter to components of the trusted platform depicted in FIG. 1 should be taken to include those present in a mobile device such as a mobile telephone or PDA. Accordingly, a mobile trusted platform can comprise a user interface which allows a user to control the device in question, and which can be controlled using one of a plurality of control mechanisms of the device such as a touch screen, buttons, joystick and so forth. Suitable mobile devices can be arranged to run any number of suitable mobile device specific operating systems.

Figure 2:
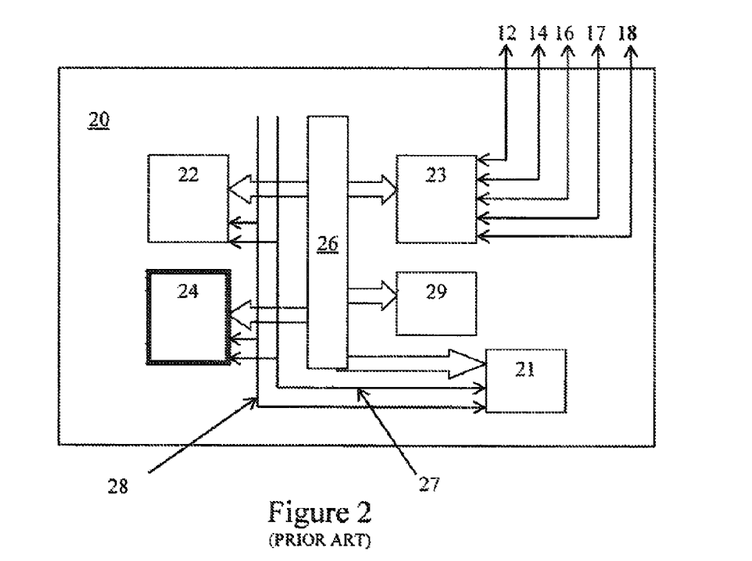
FIG. 2 is a block diagram indicating functional elements present on the motherboard of a prior-art trusted computing platform.

As illustrated in FIG. 2, the motherboard 20 of the trusted computing platform 10 includes (among other standard components) a main processor 21, main memory 22, a trusted entity here embodied in the form of trusted device 24 (such as a hardware TMM), a data bus 26 and respective control lines 27 and address lines 28, BIOS memory 29 containing the BIOS program for the platform 10, an Input/Output (IO) device 23, which controls interaction between the components of the motherboard and the input/output mechanisms of the device. The main system memory 22 is typically random access memory (RAM). The mounting of the trusted device 24 onto the device motherboard serves to physically bind it to the platform.

After reset, the main processor of the device is adapted to be initially controlled by CRTM code (which in the present example comprise hash function code stored in the trusted device 24) which then hands control over to the platform-specific BIOS program, which in turn initialises all input/output devices as normal. After the BIOS program has executed, control is handed over as normal by the BIOS program to an operating system program.

The main processor 21 is initially controlled by the CRTM code because it is necessary to place trust in the first measurement to be carried out on the trusted platform. The CRTM code is typically trusted at least in part because of its provenance. As already indicated, the main processor 21 when under control of the CRTM forms the "root of trust for measurement" RTM. As is typical, one role of the RTM in the present case is to measure other measuring agents before these measuring agents are used and their measurements relied upon. The RTM is the basis for the aforementioned 'chain of trust'. Note that the RTM and subsequent measurement agents do not need to verify subsequent measurement agents; they merely measure and record them before they execute. This is called an "authenticated boot process". Valid measurement agents may be recognised by comparing a digest of a measurement agent against a list of digests of valid measurement agents. Unlisted measurement agents will not be recognised, and measurements made by them and subsequent measurement agents are deemed to be suspect.

Example Trusted Device

Further details will now be given of an implementation of the trusted device 24, it being understood that corresponding functionality can be provided in a software trusted entity (that is, virtual trusted device).

Figure 3:
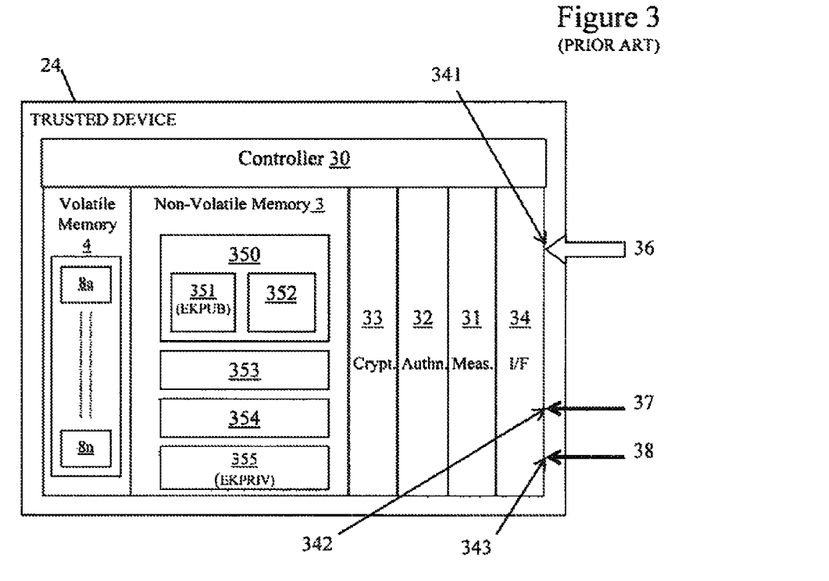
FIG. 3 is a block diagram indicating the functional elements of a prior-art trusted entity (in this instance, a trusted device) of the trusted computing platform of FIG. 2.

The trusted device 24 comprises a number of blocks, as illustrated in FIG. 3. As already indicated, after system reset the trusted device 24 participates in an authenticated boot process to ensure that the operating state of the platform 10 is recorded in a secure manner. During the authenticated boot process, the trusted device 24 acquires at least one integrity metric of the computing platform 10. The trusted device 24 can also perform secure data transfer. The trusted device 24 can also securely enforce various security control policies, such as locking of the user interface.

Specifically, the trusted device 24 in the present embodiment comprises: a controller 30 programmed to control the overall operation of the trusted device 24, and interact with the other functions on the trusted device 24 and with the other devices on the motherboard 20; a measurement function 31 for acquiring a first integrity metric from the platform 10 either via direct measurement or alternatively indirectly via executable instructions to be executed on the platform's main processor; a cryptographic function 32 for signing, encrypting/decrypting specified data; an authentication function 33 for authenticating a smart card 19; and interface circuitry 34 having appropriate ports (36, 37 & 38) for connecting the trusted device 24 respectively to the data bus 26, control lines 27 and address lines 28 of the motherboard 20. Each of the blocks in the trusted device 24 has access (typically via the controller 30) to appropriate volatile memory areas 4 and/or non-volatile memory areas 3 of the trusted device 24. As has already been described, the trusted device 24 is designed, in a known manner, to be tamper resistant.

For reasons of performance, the trusted device 24 may be implemented as an application specific integrated circuit (ASIC). However, for flexibility, the trusted device 24 can be an appropriately programmed micro-controller. Both ASICs and micro-controllers are well known in the art of microelectronics and will not be considered herein in any further detail.

The non-volatile memory 3 of the trusted device 24 stores a private key 355 (PRIVEK) of an Endorsement key (EK) pair specific to the trusted device 24; preferably, the non-volatile memory 3 also stores a certificate 350 containing at least the public key 351 (PUBEK) of the Endorsement key pair of the trusted device 24 and an authenticated value 352 of at least one platform integrity metric measured by a trusted party (TP). The certificate 350 is signed by the TP using the TP's private key prior to it being stored in the trusted device 24. In later communications sessions, a user of the platform 10 can deduce that the public key belongs to a trusted device by verifying the TP's signature on the certificate. Also, a user of the platform 10 can verify the integrity of the platform 10 by comparing one or more acquired integrity metric(s) with the authentic integrity metric value(s) 352. If there is a match, the user can be confident that the platform 10 has not been subverted. Knowledge of the TP's generally-available public key enables simple verification of the certificate 350. The non-volatile memory 35 may also contain an identity (ID) label 353. The ID label 353 is a conventional ID label, for example a serial number, that is unique within some context. The ID label 353 is generally used for indexing and labelling of data relevant to the trusted device 24, but is insufficient in itself to prove the identity of the platform 10 under trusted conditions.

As already indicated, the trusted device 24 cooperates with other elements of the platform 10 to reliably acquire at least one integrity metric of the platform. In the present embodiment, a first integrity metric is acquired by having the main platform processor execute the CRTM code 354 that is stored in the non-volatile memory 3 trusted device 24; the CRTM when executed by the platform processor generates a digest of the BIOS instructions in the BIOS memory and passes it to the measurement function for storage. Such an acquired integrity metric, if verified as described above, gives a potential user of the platform 10 a high level of confidence that the platform 10 has not been subverted at a hardware, or BIOS program, level.

It would alternatively be possible to provide a measurement engine within the trusted device and have this engine form an integrity measurement on the BIOS code on platform start up (reset).

In the present example, the measurement function 31 has access to the non-volatile memory 3 (for accessing the GRIM hash code 354) and volatile memory 4 (for storing acquired integrity metric measurements). The trusted device 24 has limited memory, yet it may be desirable to store information relating to a large number of integrity metric measurements. This is done in trusted computing platforms as described by the Trusted Computing Group by the use of PCRs 8a-8n. The trusted device 24 has a number of PCRs of fixed size (the same size as a standard measurement digest)—on initialisation of the platform, these are set to a fixed initial value.

Figure 4:
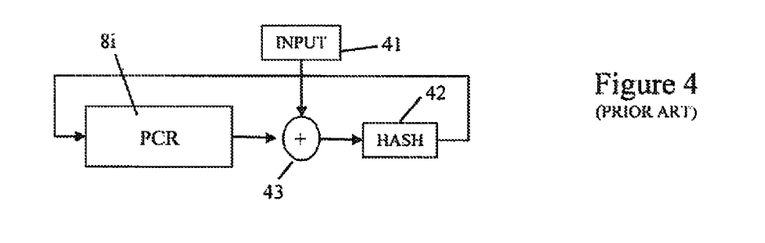
FIG. 4 is a flow chart illustrating the known prior-art process of extending values into a platform configuration register of the trusted device of FIG. 2.

Integrity measurements are then "extended" into PCRs by a process shown in FIG. 4. The PCR 8i value is concatenated 43 with the input 41 which is the value of the integrity measurement to be extended into the PCR. The concatenation is then hashed 42 to form a new 160 bit value. This hash is fed back into the PCR to form the new value of the integrity metric concerned. In addition to the extension of the integrity measurement into the PCR, to provide a clear history of measurements carried out the measurement process may also be recorded in a conventional log file (which may be simply in main memory of the computer platform). For trust purposes, however, it is the PCR value that will be relied on and not the software log.

Clearly, there are a number of different ways in which an initial integrity metric value may be calculated, depending upon the scope of the trust required. The measurement of the BIOS program's integrity provides a fundamental check on the integrity of a platform's underlying processing environment. The integrity metric measurement should be of such a form that it will enable reasoning about the validity of the boot process—the value of the integrity metric can be used to verify whether the platform booted using the correct BIOS. Optionally, individual functional blocks within the BIOS could have their own digest values, with an ensemble BIOS digest being a digest of these individual digests. This enables a policy to state which parts of BIOS operation are critical for an intended purpose, and which are irrelevant (in which case the individual digests must be stored in such a manner that validity of operation under the policy can be established).

It may also be noted that, preferably, the BIOS boot process includes mechanisms to verify the integrity of the boot process itself. Such mechanisms are already known from, for example, Intel's draft "Wired for Management baseline specification v 2.0—BOOT Integrity Service", and involve calculating digests of software or firmware before loading that software or firmware. Such a computed digest is compared with a value stored in a certificate provided by a trusted entity, whose public key is known to the BIOS. The software/firmware is then loaded only if the computed value matches the expected value from the certificate, and the certificate has been proven valid by use of the trusted entity's public key. Otherwise, an appropriate exception handling routine is invoked. Optionally, after receiving the computed BIOS digest, the trusted device 24 may inspect the proper value of the BIOS digest in the certificate and not pass control to the BIOS if the computed digest does not match the proper value—an appropriate exception handling routine may be invoked.

Once the BIOS code has been measured by the CRTM), the integrity metric measurement stored to a PCR, and the BIOS loaded, the BIOS preferably measures the next software component (such as OS loader) and causes a corresponding integrity metric measurement to be stored in the trusted device 24 before loading that software, and so on (see FIG. 5); in this way, a chain of trust ('transitive trust') can be built up to include the operating system and applications loaded by it, with corresponding integrity metrics being stored in the PCRs of the trusted device 24.

Figure 5:
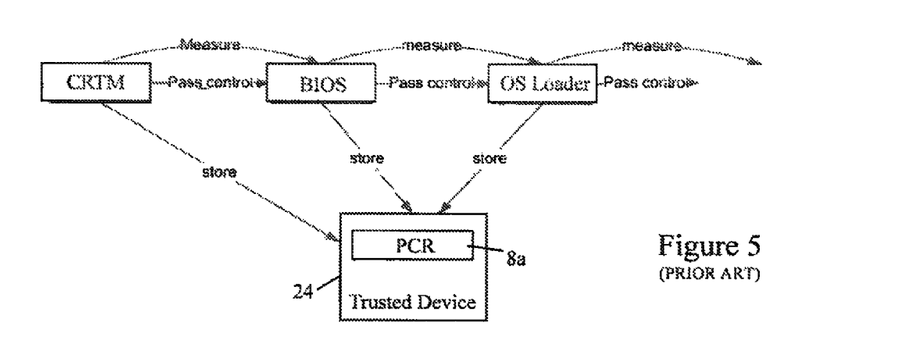
FIG. 5 is a flow diagram illustrating the principle of transitive trust in a prior-art trusted computing platform.

Other integrity checks may be carried out involving the measuring of program code and storing of a corresponding integrity metric measurement in the trusted device; for example, the CRTM or BIOS could be arranged to measure the BIOS programs associated with a SCSI controller to enable communications with peripheral equipment to be trusted. Other forms of integrity check may also be effected, for example memory devices or co-processors, on the platform could be verified by enacting fixed challenge/response interactions to ensure consistent results; these checks can also give rise to integrity metrics stored in the PCRs of the trusted device 24.

As will be clear from the foregoing, a large number of integrity measurements may be collected by measuring agents directly or indirectly measured by the RTM, and these integrity measurement extended into the PCRs of the trusted device 24. Some—often many—of these integrity measurements will relate to the software state of the trusted platform. How the PCRs are allocated is preferably standardized for each platform type. By way of example, according to the TCG Specification for PC Clients, the PCRs are divided into two primary sets: the first set is designated for the platform's pre-OS environment (PCR[0-7]) and the other set designated for the platform's OS (PCR[8-15]). In this case, the pre-OS PCRs provide the platform's initial chain of trust starting from platform reset; in other words, they establish a chain of trust from the CRTM through the OS's IPL (Initial Program Load) Code.

Changes to a software component after its initial measurement and loading result in the software component being re-measured and the resulting integrity measurement being passed to the trusted device to extend the PCR associated with that component.

Figure 6:
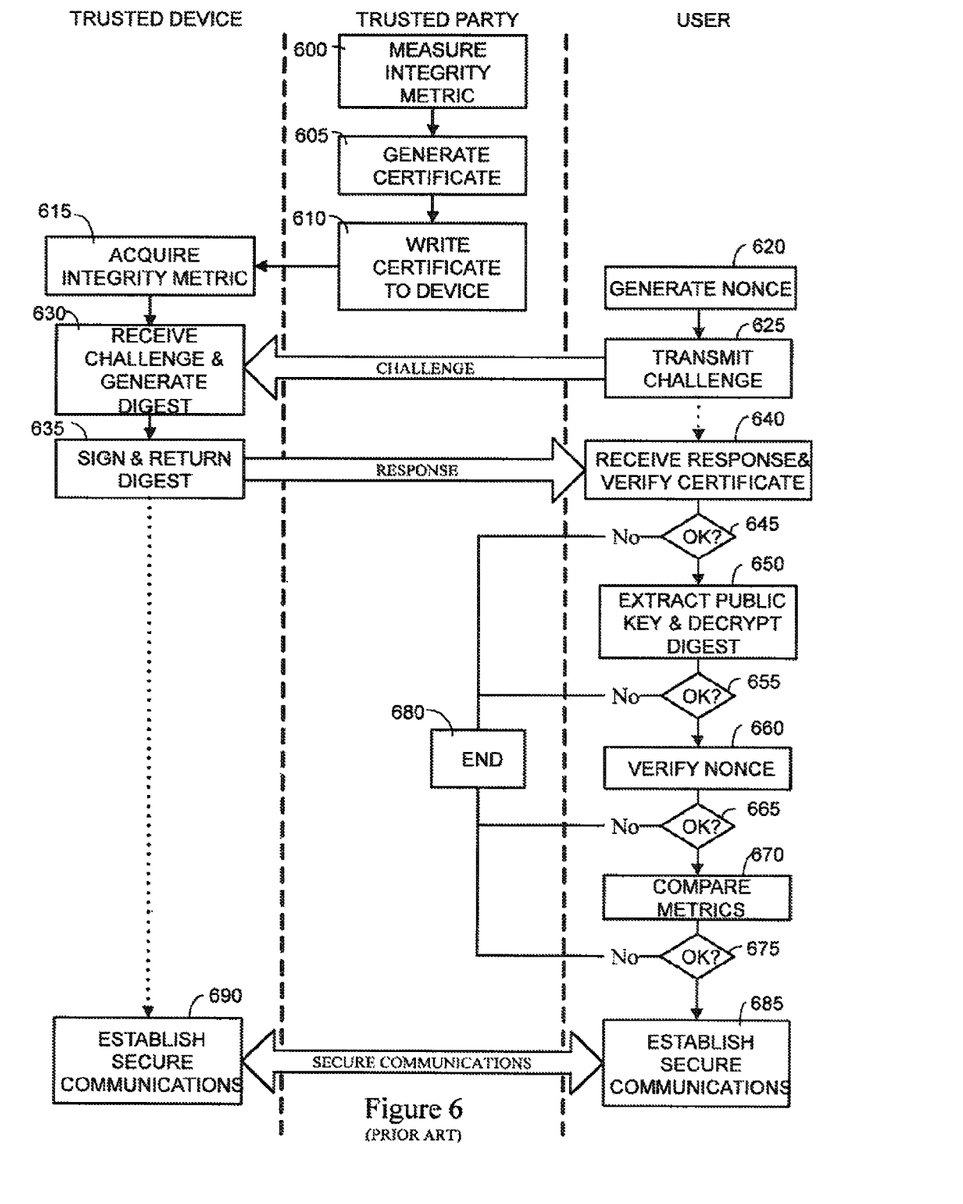
FIG. 6 is a flow diagram illustrating a known integrity challenge/response process.

As already indicated, when a user wishes to communicate with the platform, he uses a challenge/response routine to challenge the trusted device 24 (the operating system of the platform, or an appropriate software application, is arranged to recognise the challenge and pass it to the trusted device 24, typically via a BIOS-type call, in an appropriate fashion). The trusted device 24 receives the challenge and creates an appropriate response based on the measured integrity metric or metrics—this may be provided with the certificate(s) giving expected integrity-metric value(s) and signed. This provides sufficient information to allow verification by the user. FIG. 6 illustrates in more detail the overall process by which a user (for example, of a remote platform) can verify the integrity of the trusted platform incorporating the trusted device 24.

As a preliminary step a trusted party TP, which vouches for trusted platforms, will have inspected the type of the platform to decide whether to vouch for it or not. This will be a matter of policy. If all is well, in step 600, the TP measures the value of integrity metric 352 of the platform. Then, the TP generates a certificate 350, in step 605, for the platform. The certificate is generated by the TP by appending the trusted device's public key (EKPUB), and optionally its ID label, to the measured integrity metric, and signing the string with the TP's private key.

In step 610, the trusted device 14 is initialised by writing the certificate 30 into the appropriate non-volatile memory locations of the trusted device 24. This is done, preferably, by secure communication with the trusted device 14 after it is installed in the motherboard 10. The secure communications is supported by a 'master key', known only to the TP, that is written to the trusted device during manufacture, and used to enable the writing of data to the trusted device 24; writing of data to the trusted device 14 without knowledge of the master key is not possible.

At some later point during operation of the platform, for example when it is switched on or reset, in step 615, the trusted device 24 acquires and stores one or more integrity metrics of the platform in its PCRs.

When a user wishes to communicate with the platform, in step 620, he creates a nonce, such as a random number, and, in step 625, challenges the trusted device 24. The nonce is used to protect the user from deception caused by replay of old but genuine signatures (called a 'replay attack') by untrustworthy platforms. The process of providing a nonce and verifying the response is an example of the well-known 'challenge/response' process.

In step 630, the trusted device 24 receives the challenge and creates a concatenation of one, some or all of the measured integrity metrics (PCR values), the nonce, and optionally its ID label. Then, in step 635, the trusted device 24 signs the concatenation, using its private key EK, and returns the signed concatenation, accompanied by the certificate, to the user.

In step 640, the user receives the challenge response and verifies the certificate using the well known public key of the TP. The user then, in step 650, extracts the trusted device's 24 public key from the certificate and uses it to decrypt the signed concatenation from the challenge response. Then, in step 660, the user verifies the nonce inside the challenge response. Next, in step 670, the user compares the reported PCR values, which it extracts from the challenge response, with the authentic platform integrity metric value(s), which it extracts from the certificate. If any of the foregoing verification steps fails, in steps 645, 655, 665 or 675, the whole process ends in step 680 with no further communications taking place.

It will be appreciated that authentic values for the PCRs can be obtained by the challenger in any suitable manner (for example, direct from a trusted party) and it is not necessary that these authentic values be provided through a certificate stored in the TPM.

Assuming all is satisfactory, in steps 685 and 690, the user and the trusted platform use other protocols to set up secure communications for other data, where the data from the platform is preferably signed by the trusted device 24.

Steps 620 to 675 constitute an attestation protocol (the procedure by which a challenger can validate a platform based on TPM-signed PCR values). In fact, the attestation protocol is usually (though not necessarily) enhanced in at least two areas:

Firstly, rather than the TPM using its private Endorsement Key PRIVEK in step 635, it uses a short term private key that is part of a so-called Attestation Identity Key (AIK) pair; the reason for this is that, if only the EK is employed, it can be used to link transactions involving the TPM which is usually undesirable from a privacy viewpoint. The TPM is therefore preferably arranged to generate a succession of AIKs each of which is vouched for by a trusted party as belonging to a valid TPM (the trusted party vouches for the AIK by providing a signed certificate for the public part of the AIK). Other mechanisms (such as 'Direct Anonymous Attestation') can alternatively be used to provide TPM anonymity.

Secondly, the TPM reports not only one or more PCR values, but also a log of the measurements taken. This log (referred to as the Stored Measurement Log, SML) is created by the TPM to record in full the integrity measurements made, in the order they are made; this gives a much greater visibility as to what software has been loaded onto the platform than is provided by the PCR values which are digests of these measurements. The SML occupies a lot more memory than the PCR values and is therefore not stored in the TPM; however, secure storage of the SML is not required. The challenger, on receiving the SML can check the measurement values it contains with authentic values for the software concerned (these authentic values being Obtained in any suitable manner); assuming the measurement values check out, they can then be used to compute expected values for the reported PCRs. The expected and reported PCR values are then compared and if they match then the platform state is validated. Use of the SML not only provides greater transparency but also greater efficiency since the number of authentic measurement values needed in any given environment (for example one for each software module loadable) is significantly less than the potential number of PCR values that could result (as latter number depends not only on the possible number of combinations of software modules loaded, but also on their order of loading).

Protected Storage—Sealing/Unsealing Data

Figure 7:
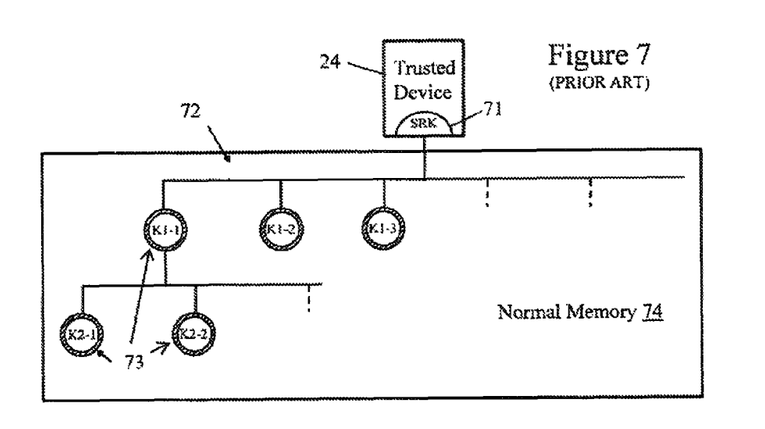
FIG. 7 is a block diagram illustrating a key hierarchy associated with a trusted entity such as a trusted device.

As indicated above, a trusted entity such as the trusted device 24 may include trusted functionality (RTS) that provides a 'protected storage' mechanism for sealing data (typically keys or passwords) into an opaque blob held outside the trusted entity, the blob being subsequently accessible only when the platform is in a particular (trusted) state. This state is specified at the time of sealing by a digest of the values of some or all the PCRs. To unseal the data blob, the same digest must be formed from the current values of the PCRs. If the new digest is not the same as the digest in the opaque blob, then the user cannot recover the data.

One approach to implementing protected storage in the trusted device 24 will now be described. As illustrated in FIG. 7, in this approach, protected storage is implemented as a hierarchy (tree) 72 of nodes storing data Objects, the root of which is a Storage Root Key (SRK) 71 that is permanently stored in the trusted device 24 (and not released from it). Apart from the SRK, the tree 72 can be stored outside of the trusted device in normal memory 74. When information in a node is used or revealed, the node is manipulated by the trusted device. Each intermediate node object in the tree is encrypted by a key in the node object above it in the tree (the parent node), all the way back to the SRK root node; in FIG. 7 two levels are shown below the SRK, namely a first level storing keys K1-1 to K1-3 and a second level storing keys K2-1 and K2-2, the encrypted nature of each key being indicated by the surrounding hatched annulus). Each key has an associated authorisation value that an entity wishing to make use of the key must present to the trusted device 24 (or, more accurately, used in a protocol embodying a policy that proves knowledge of the value without revealing the value) before the trusted device permits the key to be used. Intermediate nodes in the tree will always be keys but leaf nodes can be arbitrary data. (though frequently they will also be keys, such as symmetric keys for use by application processes in protecting bulk data).

Key's in the tree can generally be "migratable" or "non-migratable". Migratable keys can be unsealed and passed to other trusted devices; multiple copies may therefore exist. A migratable key may be used for signing e-mails from a particular user, and may, for example, reside on both the user's work and home computers. Such keys may have been generated by the trusted device, or by any other application or device outside of the trusted device, there is no guarantee about the origin or trustworthiness of the private key, and there is no easy way for a trusted device to determine whether an intended destination for a migratable key is safe and secure. A non-migratable key is generated by a particular trusted device and is not intended to be revealed outside of that device; it is only known to the trusted device, and is, therefore, inherently secure but not portable between trusted devices. Non-migratable keys are used, for example, to prove the identity of the trusted entity. Another class of key is a certified migratable key ("CMK", as defined by Version 1.2 of the TGC Specification). A CMK is a kind of key that is halfway between a non-migratable key and a migratable key. A CMK is migratable, but in one mode of operation can only be migrated from one platform to another if permissions from the owner of a trusted component and a respective Migration Selection Authority (MSA) are authenticated as part of a special CMK migration protocol, which is performed by a respective trusted device which stores the CMK. Thus, a CMK is both portable between trusted devices and relatively secure.

By convention it is desirable to store non-migratable keys in one or more branches of a storage hierarchy tree and migratable keys in different branches, thereby making it relatively simple for a trusted device to manage different classes of keys. CMKs may be stored in yet other branches. This arrangement (of using different branches for different classes of key) may be replicated for each user of a trusted platform, so that only keys belonging to one user are stored in each branch.

Second Example Prior-Art Trusted Platform

Assuming that integrity metrics are recorded for the operating system and applications loaded by the operating system, the above-described trusted platform 10 enables a user to check the state of the platform and decide whether or not to trust it. If the operating system has run an application that is not trusted by a first user (though possibly trusted by a different user), the first user can detect this (even after the application has terminated) by checking the relevant PCRs. However, in this case, for the above-described trusted platform, the only way for trust in the platform to be re-established for the first user is for the platform to be re-started. This drawback is multiplied where the platform is used to run a compartmented operating system supporting multiple computing environments since, unless appropriate measures are in place, running an un-trusted application in any of the environments requires the platform to be re-started to re-establish trust.

A solution to this is to provide a hardware/software architecture that enables the core software (BIOS & operating system/hypervisor) to be isolated from higher-level software so that if the latter is not trusted, it is only necessary to rebuild trust from the core software (assuming the latter is trusted). Where the core software supports multiple computing environments, then provided the latter are isolated from each other, an untrusted environment can be restarted without restarting the core software or the other computing environments supported by it. Furthermore, where multiple computing environments are supported, it is convenient to provide a respective trusted entity (typically a virtual trusted device) for each such environment.

An example trusted platform 80 supporting multiple isolated computing environments will now be briefly described with reference to FIG. 8. A fuller description of various forms of trusted platform of this type can be found in US published patent application US 2005/0223221, incorporated herein by reference.

Figure 8:
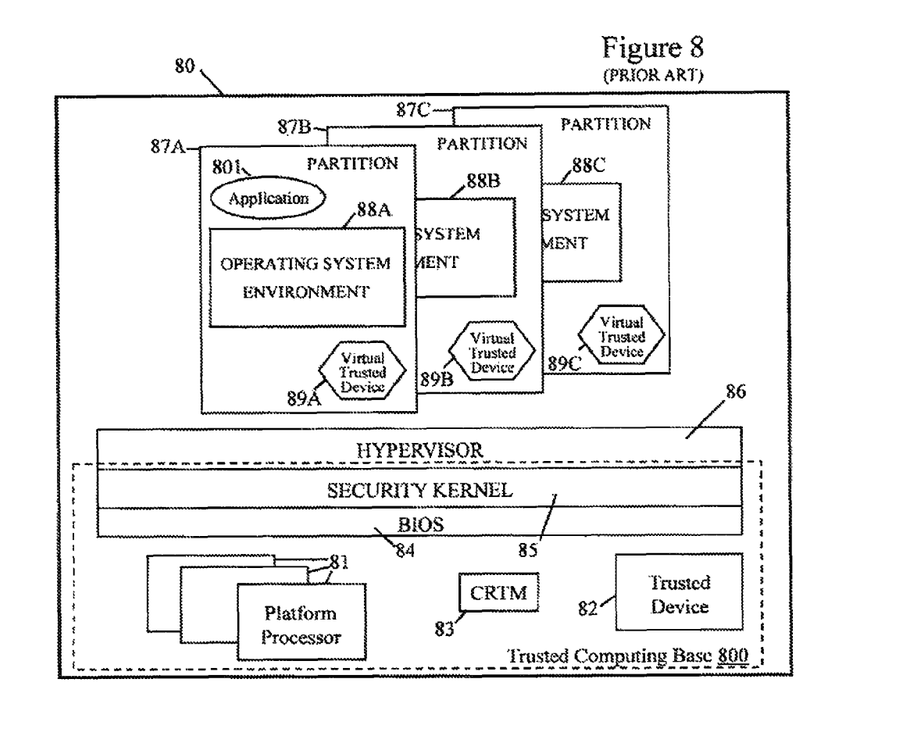
FIG. 8 is a functional block diagram of a further prior-art trusted computing platform running a hypervisor and providing for multiple isolated trusted operating system environments.

The trusted platform 80 shown in FIG. 8 has one or more platform processors 81 and a hardware trusted device 82 similar to the previously described trusted device 24 but with the code forming the CRTM being in a separate ROM 83. In equivalent manner to that described above for the platform 10 and trusted device 24, following a platform reset, the CRTM code is run by one of the main platform processor 81 to determine an integrity metric for the BIOS code (stored for example in the same RUM 83 as the CRTM) and pass the metric to the trusted device 82 for insertion into a. PCR. Thereafter, the BIOS is loaded 84 which in turn measures and records in trusted device 82 an integrity metric of security kernel code before loading the security kernel 85; the security kernel 85 then measures and records in trusted device 82 an integrity metric of hypervisor code before loading the hypervisor 86 (also called a virtual machine monitor). In practice, there will typically be more integrity metrics recorded and intermediate code modules loaded. The elements 81 to 85 form the trusted computing base 800 of the platform 80. The hypervisor 86 may also be considered part of the trusted computing base with the proviso that for any complex program such as hypervisor 86, while it is possible to verify that the hypervisor code on the platform is identical to a reference version, it is very difficult to be sure that the reference version itself does not possess any security weaknesses.

The hypervisor 86 enables a plurality of operating system environments to be provided each in its own partition isolated from the other operating system environments; in FIG. 8, by way of example, three operating system environments 88A, 88B and 88C are shown, each in its own respective partition 87A, 87B, 87C; each partition may be arranged to execute on a different platform processor 81, thereby improving the degree of isolation. The hypervisor 86 enables and protects communications between the partitions and with the outside world. Applications are run as required in an appropriate one of operating system environment; in the present case one application 801 is shown running in operating system environment 88A.

Additional/alternative guarantees of separation of the partitions can be provided by using a main platform processor that provides multiple privilege levels. In this case the BIOS 84 and the security kernel 85 are, for example, run at the most privileged level of the main platform processor 81 while the hypervisor 86 is run at the second most privileged level of the main platform processor 81. All other code is run at a lower privilege level (applications typically run at the lowest privilege level, below that of the operating system environments) thus providing isolation of the BIOS 84, the security kernel 85 and the hypervisor 86 from potentially untrustworthy code.

It will be appreciated that, in effect, each partition 87A, 87B, 87C provides a virtual computing platform environment, which is substantially independent of (e.g. encapsulated or compartmentalised) other such computing environments. To a user, such an environment appears to behave in exactly the same way as a standard, standalone computing platform, even down to the ability to re-boot the platform: where a re-boot operation of a virtual computing platform re-boots only the resources available in the relevant partition (in other words, a re-boot operation would not have any effect on other virtual computing platforms).

In the present example, each partition 87A, 87B, 87C has its own associated virtual trusted device 89A, 89B, 89C (although shown in FIG. 8 in each partition, the virtual trusted devices are logically part of the security kernel and, for a main processor with privilege levels, can be run at the same privilege level as the security kernel or in a separate partition). The hardware trusted device 82 is responsible for storing integrity metrics of the code for the virtual devices and related trust functionality (such as virtual RIM). Thereafter, the virtual trusted device 89 of a partition is responsible for recording and reporting integrity metrics for the related operating system environment and any applications it is running Each virtual trusted device has its own AIK(s) for signing its integrity metric reports; such an AIK is issued by a credible entity (which could be the hardware trusted device 82) on the basis of the integrity measures reported by the device 82 for the trusted computing base and the virtual trusted device code. A full report of the integrity metrics relevant to an application in a given partition is a combination of:

- the integrity metrics for the trusted computing base and virtual trusted device code, signed by the hardware trusted device; and
- the integrity metrics of the application and its operating system environment, signed by the relevant virtual trusted device.

It will be appreciated that the isolation provided by the platform 80, minimises the software that must be re-started to re-establish trust in any particular partition. It will also be appreciated that the arrangement of having one hardware trusted device 82 for the trusted computing base 800 and one virtual trusted device per partition is merely one possibility among many, including just having a single hardware or virtual trusted device for the entire platform.

In general terms, embodiments of the invention enable a trusted entity to delegate responsibility for enforcing policies to external policy engines: external in the sense of being outside of a trusted entity, for example, either on the same trusted platform or on a remote platform.

Thus, even complex policies can be performed without significant additional resources being required within a trusted device, thereby enabling trusted devices to remain relatively inexpensive. The policy engines may relate to use of a key inside a trusted entity, the release of a secret from a trusted entity, migration of a key from (or into) a trusted entity etc. Indeed, the principles may be applied to any trusted process that requires enforcement of a policy. Embodiments of the invention rely upon a realisation that an application that uses a key or a secret is already, by default, asserting a policy; that being when to use a key or secret. For example, if a key is to be used by application software in an environment, or a secret revealed by a trusted entity to application software in an environment, other software in that environment can be protected to the same degree as the application. Hence, software outside the trusted entity (a policy engine) can be used to apply an arbitrarily complex policy before use of the key, or revelation of the secret, by an application.

In a device with no provision for a hardware trusted module, a software core for performing the same tasks can be provided as described above. For example, in certain devices in which cost and/or space is at a premium, it can be desirable to implement a trust module in software. Accordingly, a Mobile Trusted Module (MTM) is a security element which forms part of the TCG specification for use in mobile and embedded devices. The implementation of the MTM is provided as software functionality rather than a physical implementation in hardware. A mobile telephone for example would typically contain multiple MTMs, all of which provide similar functionality to existing TPMs and some of which have additional functionality to boot parts of a telephone into a preset state.

One MTM command is "MTM_Verify RIMCertAndExtend", (RIM=Reference Integrity Metric) which enables functionality in an embedded platform that is equivalent to TCG's locality authorisation in non-embedded platforms. This command uses a first public key to verify a signed credential over PCR values plus a measurement to be extended into a stated PCR. If verification is successful, and the PCR values in the credential are the same as those currently in the MTM, the measurement from the credential is extended into the stated PCR by the MTM. The first public key is itself verified before it is used. It can be verified by comparing it to a value stored in the MTM. It can be verified by checking a signature over the first public key using a second public key that is verified by comparing it to a value stored in the MTM. This methodology can be generalised to using any depth of public key hierarchy in order to verify the credential, where the root of the hierarchy is verified by comparing it (in some desired manner) to a value stored in the TPM. Accordingly, when a PCR update is initiated by an MTM_VerifyRIMCertAndExtend command, the signature on the external RIM certificate is checked by a loaded verification key indicated by a key handle in the command. If the signature matches, and the preconditions, counter value equivalence and PCR contents also match, a given PCR is updated with a value stated in the RIM certificate.

Figure 9:
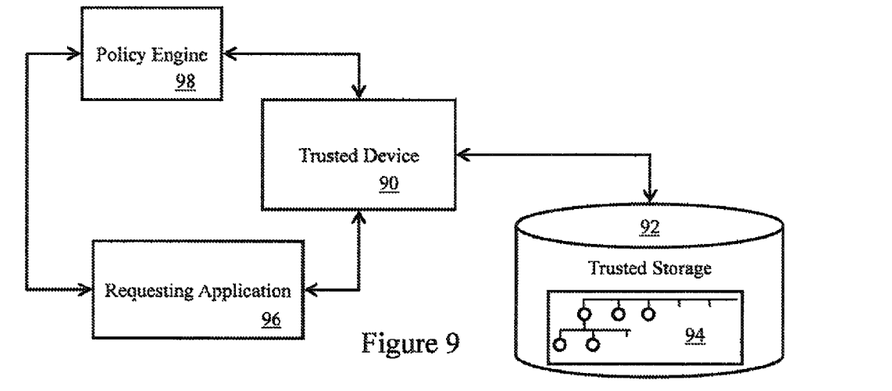
FIG. 9 is a functional block diagram according to an embodiment of the invention of a trusted device and an associated external policy engine, which the trusted device uses to enforce a policy on a respective secure operation request received from a requesting application.

In FIG. 9, a trusted entity is a trusted hardware device 90, which is shown attached to trusted storage 92 (system RAM or a normal hard disk, for example), which contains a protected storage hierarchy 94, as described above. The trusted device 90 is in communication with a requesting application 96 and a policy engine 98. The arrangement in FIG. 9 operates according to the flow diagram in FIG. 10.

Figure 10:
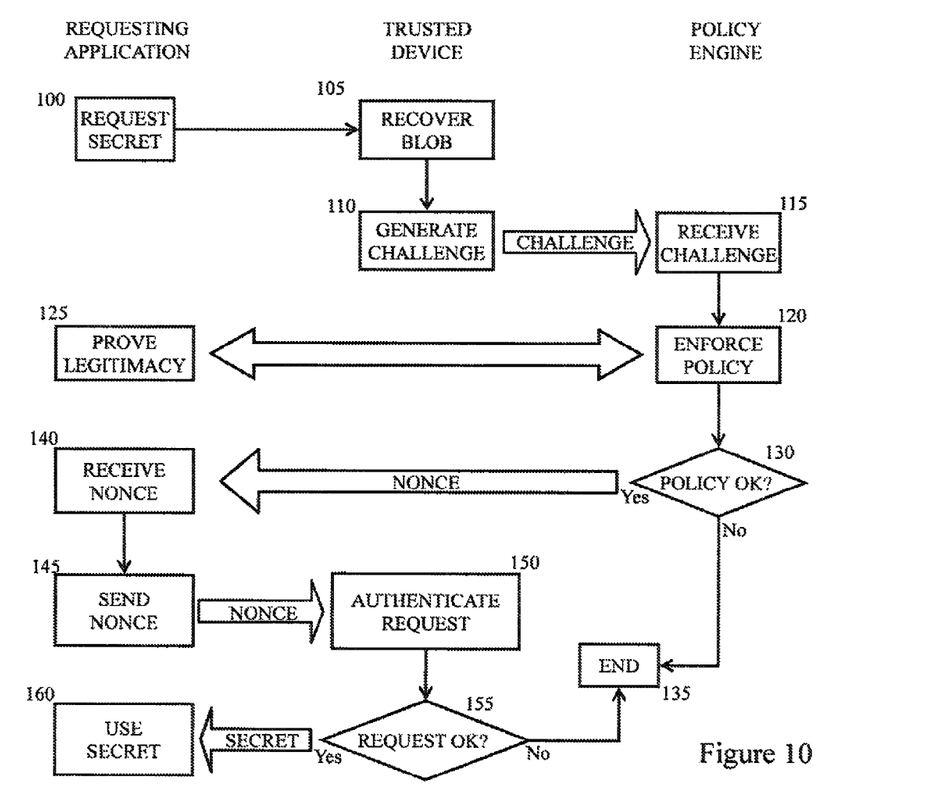
FIG. 10 is a flow diagram according to an embodiment of the invention of a trusted process enacted by a trusted device using an external policy engine.

With reference to FIG. 10, the requesting application 96 communicates [step 100] with the trusted device 90 and asks the trusted device to carry out a secure operation of some kind (e.g. release, receive, or in some way operate on a secret, for example a key, a password or the like). For the purposes of the present example, it is assumed that the request is to release a secret, which is stored in a blob. The trusted device 90 receives the request and recovers the blob [step 105] from the trusted storage 92.

Next [step 110] the trusted device 90 generates a challenge, comprising an authorisation value (authValue), which is passed to and received by the identified policy engine 98 [step 115]. The trusted device 90 also keeps a copy of the authValue for future comparison purposes.

In this simple embodiment, the authValue comprises a newly generated nonce (a random number). The policy engine 98 and requesting application 96 interact [steps 120 and 125] to enforce the policy in an appropriate manner, typically verifying authorisation and/or authentication that are additional to any authorisation or authentication inherent in the requesting application 96. Additional authorisation and/or authentication can take various forms. For example, it may include entry by a user controlling the requesting application 96 of a password into a graphical user interface pop-up box, or use of a smart card 19 and entry by the user of an associated password.

If the requesting application 96 (and, potentially, a user controlling the requesting application) are not authenticated [step 130], then the policy is deemed not satisfied and the process ends [step 135]. If the requesting application 96 (and any user controlling the requesting application) are authenticated [step 130], then the policy is deemed satisfied and the policy engine 98 passes the authValue to the requesting application 96, which receives the authValue [in step 140]. Subsequently [step 145] the requesting application 96 communicates the authValue to the trusted device 90 and the trusted device compares the received authValue with the stored copy [step 150] in order to authenticate the request. If the received authValue does not match the stored copy, then the process ends [step 135]. If, however, the received authValue matches the stored copy, the trusted device 90 accepts that the policy must have been satisfied and releases the secret to the requesting application [step 160].

Figure 11:
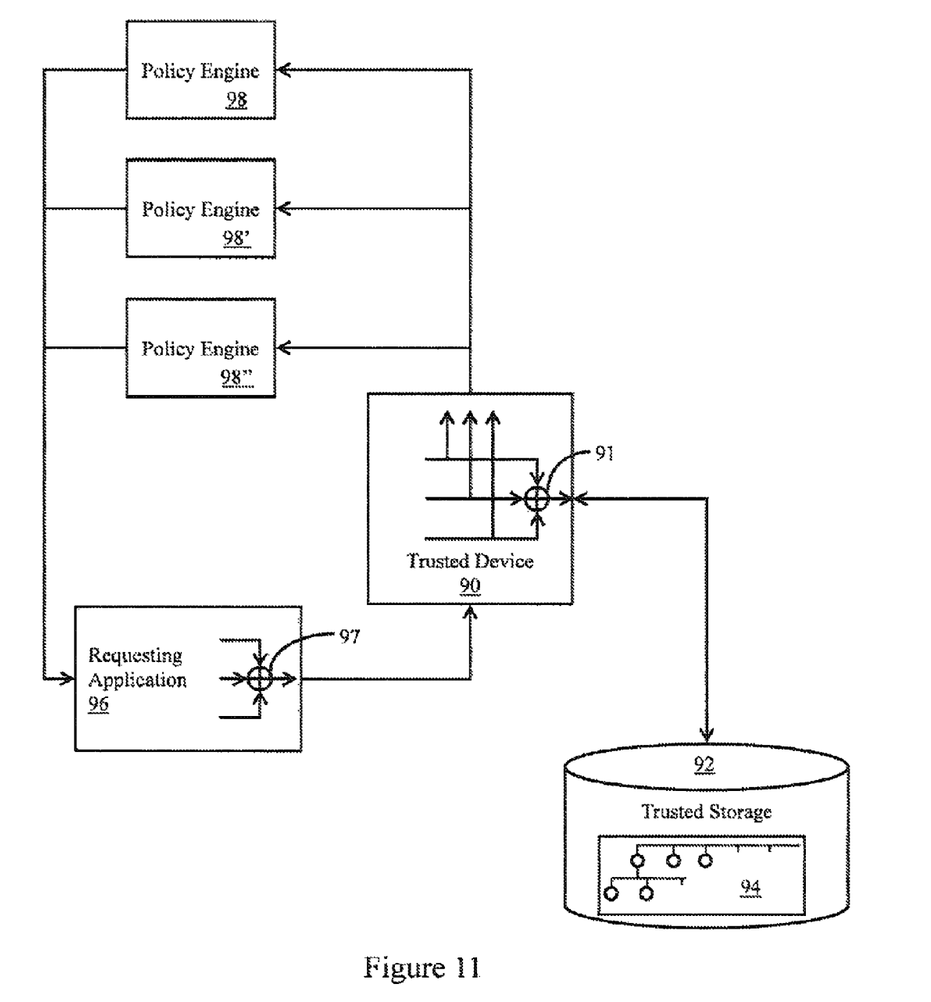
FIG. 11 is a functional block diagram according to another embodiment of the invention of a trusted device and three associated external policy engines, which the trusted device uses to enforce three respective policies on a secure operation request received from a requesting application.

The diagram in FIG. 11 illustrates an alternative scenario to the one illustrated in FIG. 9. In FIG. 11, the reference numerals are the same as in FIG. 9, apart from there being two additional policy engines, 98' and 98". In this instance, a request from the requesting application 96 requires three different policies to be satisfied before the trusted device 90 will release the secret. Consequently, the trusted device 90 may store in one or more blobs the identities of each policy engine. In this example, the trusted device 90 generates three different challenges (one for each policy engine) in which each challenge comprises a different authValue (nonce), and seals each of the nonces to measurements of respective policy engines. If the requesting application 96 satisfies each policy then each policy engine forwards its respective nonce to the requesting application 96. If the requesting application 96 is able to send the correct number and form of nonces to the trusted device 90 then the trusted device believes that the policies must have been satisfied and releases the secret to the requesting application 96.

As indicated, where plural policies need to be enforced, as in the scenario illustrated in FIG. 11, each challenge for each policy engine may contain a different authValue. Instead of storing copies of each individual authValue, the trusted device 90 may use 'secret sharing' to combine the authValues (or authValue shares) into a single authValue, for example, by exclusive-OR'ing 91 the AuthValue shares together and storing the resulting authValue. When the requesting application 96 receives each authValue share from the policy engines (assuming, of course, it satisfies each policy) it can also exclusive-OR 97 the shares together into a single authValue, which it passes to the trusted device 90. The trusted device 90 can then compare the received authValue with the stored authValue in a single comparison operation.

Responses can be combined one by one, by recording in a policyHash register (similar to a PCR register) the method that was used to verify each response. The final contents of the policyHash register are then compared with a policyDigest value in the target key, for example. If they are the same, the use of the key has been authorised via the policy mechanism, for example.

The TCG's TPM Work Group has defined an authorisation method which enables construction and verification of amongst other operators, a Boolean AND equation, where each item in the equation represents an operation upon data. If an operation completes successfully, some data that is representative of the operation is extended into a policy register called the policyHash, in a way that is similar to the extend process performed on a PCR. If the contents of the policyHash match a policyDigest stored within an object such as one of TCG's keys, an operation upon that object is deemed to be approved. Commands from the authorisation method are therefore called 'policy commands', since the method can be used to verify a policy associated with an object.

The method of implementing the functionality of an MTM_VerifyRIMCertAndExtend command can be performed using the authorisation scheme, specifically by using three commands:

1. a policy command that provides a list of PCRs plus a measurement value, and causes the TPM to extend the list plus the current values of the listed PCRs plus the PCR intended to be extended into the policyHash.

2. a policy command that verifies a signature over the [digest of the] value extended into the policyHash in the previous policy command, and (if verification succeeds) causes the TPM to extend the verification key, plus an indication that it is a verification key, into the policyHash.

3. a policy command that compares the [digest of the] value extended into the policyHash in the previous policy command with a value stored in the TPM, and (if they are the same) causes the TPM to extend the stored value, plus an indication that it is a stored value, into the policyHash.

Commands (1) and (2) and (3) enable the dedicated VerifyRIMCertAndExtend command to be eliminated.

An example of the steps to be taken to authorise an extend operation upon a PCR using a three level public key hierarchy is as follows:

(i) use command (1) at the start of a policy session. The value extended into the policyHash register is a value equivalent to the contents of VerifyRIMCertAndExtend credential, apart from the actual measurement value.

(ii) use command (2) to verify, using a first verification public key, that the credential value is the expected value. The value extended into the policyHash register is the [first] verification public key plus an indication that it is a verification key.

(iii) use command (2) to verify, using a second verification public key, that the [first] verification public key used in the previous command is the expected value. The value extended into the policyHash register is the current [second] verification public key plus an indication that it is a verification key.

(iv) use command (2) to verify, using a third public key, that the [second] verification public key used in the previous command is the expected value. The value extended into the policyHash register is the current [third] verification public key plus an indication that it is a verification key.

(v) use command (3) to verify that the [third] verification public key used in the previous command is the expected value. The value extended into the policyHash register is the [third] verification public key used in the previous command plus an indication that it is a stored value.

According to an implementation, steps (i) (ii) and (v) are required, irrespective of the depth of public key hierarchy. Steps (iii) and (iv) are not required if the public key hierarchy is one level. Step (iv) is not required if the public key hierarchy is just two levels. Additional copies of steps (iii) or (iv) are required if the public key hierarchy is more than three levels.

Accordingly, the elimination of a dedicated MTM_VerifyRIMCertAndExtend command, and its replacement by generalised commands is provided.

The invention claimed is:

1. A method of extending an integrity measurement in a trusted device operating in a trusted platform by using a set of policy commands to:
   extend into a policy register: a list of Platform Configuration Registers (PCRs) for the device, current values of the listed PCRs, an integrity value identifying the integrity measurement, and a PCR, from the list of PCRs, intended to be extended into the policy register;
   verify a signature over the integrity value extended into the policy register, and, when verification succeeds, extend a verification key of the trusted platform, plus an indication that it is a verification key, into the policy register, wherein verifying the signature is performed using a first verification public key and wherein the verification key extended into the policy register is the first verification public key plus an indication that it is a verification key;
   compare the integrity value extended into the policy register with a value stored in the trusted platform, and, when the compared values are the same:
      extend the stored value, plus an indication that it is a stored value, into the policy register; and
      extend the integrity measurement in the trusted device when the stored value in the policy register matches a value stored with the integrity measurement.

2. The method as claimed in claim 1, wherein the integrity measurement includes contents of the PCR.

3. The method as claimed in claim 1, wherein the trusted platform is an embedded trusted platform.

4. The method as claimed in claim 1, wherein extending a list of PCRs uses a policy command at the start of a policy session.

5. The method as claimed in claim 1, wherein the integrity value extended into the policy register is a value equivalent to contents of a dedicated certify and extend credential in a trusted platform environment.

6. The method as claimed in claim 1, further comprising:
   verifying, using a second verification public key, that the first verification public key used in a previous command is an expected value.

7. The method as claimed in claim 6, wherein the value extended into the policy register is the second verification public key plus an indication that it is a verification key.

8. A device operating in a trusted platform, the device comprising:
   a hardware processor; and
   memory comprising computing instructions for extending an integrity measurement in the device by using a set of policy commands to:
      extend into a policy register: a list of Platform Configuration Registers (PCRs) for the device, current values of the listed PCRs, an integrity value identifying the integrity measurement, and a PCR, from the list of PCRs, intended to be extended into the policy register;
      verify a signature over the integrity value extended into the policy register, and when verification succeeds, extend a verification key of the trusted platform, plus an indication that it is a verification key, into the policy register, wherein verifying the signature is performed using a first verification public key and wherein the verification key extended into the policy register is the first verification public key plus an indication that it is a verification key;
      compare the integrity value extended into the policy register with a value stored in the trusted platform, and, when the compared values are the same:
         extend the stored value, plus an indication that it is a stored value, into the policy register; and
         extend the integrity measurement in the device when the stored value in the policy register matches a value stored with the integrity measurement.

9. The method as claimed in claim 1, wherein extending the integrity measurement in the trusted device includes concatenating the PCR value with the integrity measurement to be extended into the policy register.

10. The device as claimed in claim 8, wherein extending the integrity measurement in the device includes concatenating the PCR value with the integrity measurement to be extended into the policy register.

* * * * *